United States Patent [19]
Boone

[11] Patent Number: 5,724,865
[45] Date of Patent: Mar. 10, 1998

[54] CASELESS TRANSMISSION STRUCTURE

[75] Inventor: F. Michael Boone, Canton, Ill.

[73] Assignee: Caterpillar Inc., Peoria, Ill.

[21] Appl. No.: 877,425

[22] Filed: Jan. 17, 1997

Related U.S. Application Data

[63] Continuation of Ser. No. 572,450, Dec. 14, 1995, abandoned.

[51] Int. Cl.⁶ .............................. F16D 13/58; F16H 57/02
[52] U.S. Cl. ........................... 74/606 R; 192/112; 403/3
[58] Field of Search ........................... 74/572, 573 R, 74/574, 606 R, 745; 192/112; 403/3, 337; 475/60, 126

[56] References Cited

U.S. PATENT DOCUMENTS

| | | | |
|---|---|---|---|
| 2,361,190 | 10/1944 | Gerst | 192/112 |
| 3,207,142 | 9/1965 | Gorissen et al. | 192/112 X |
| 3,916,729 | 11/1975 | Herr | 74/751 |
| 3,942,502 | 3/1976 | Gorres et al. | 192/112 X |
| 4,267,805 | 5/1981 | Schmuck | 192/112 |
| 4,321,990 | 3/1982 | Koch | 192/112 |
| 4,365,696 | 12/1982 | Telford | 192/112 X |
| 4,435,990 | 3/1984 | Chalmers | 74/606 R |
| 4,628,768 | 12/1986 | Omura et al. | 74/606 R X |
| 4,646,902 | 3/1987 | Maruyamano et al. | 192/112 X |
| 4,684,001 | 8/1987 | Carlson | 192/112 X |
| 5,016,743 | 5/1991 | Kajino | 192/112 X |
| 5,025,674 | 6/1991 | McAskill | 74/360 |
| 5,203,441 | 4/1993 | Monette | 192/112 |
| 5,299,880 | 4/1994 | Bouchard | 403/3 |
| 5,370,014 | 12/1994 | Pigozzi et al. | 74/606 R X |
| 5,465,630 | 11/1995 | Iwamoto | 74/331 |
| 5,524,508 | 6/1996 | Peters | 74/606 R |
| 5,566,591 | 10/1996 | Burkett | 74/606 R |

FOREIGN PATENT DOCUMENTS

| | | | |
|---|---|---|---|
| 0367960 | 5/1990 | European Pat. Off. | 192/112 |
| 4-136557 | 5/1992 | Japan | 192/112 |
| 4-140518 | 5/1992 | Japan | 192/112 |
| 975809 | 11/1964 | United Kingdom . | |
| 2254898 | 10/1992 | United Kingdom | 74/606 R |
| 2197700 | 8/1997 | United Kingdom . | |

Primary Examiner—Vinh T. Luong
Attorney, Agent, or Firm—Calvin E. Glastetter

[57] ABSTRACT

A caseless transmission structure is disclosed. The subject transmission arrangement has a flywheel housing, a drop box housing and a center section constructed of a plurality of clutch housing positioned between the flywheel housing and the drop box housing. A seal is positioned between each adjacent housing to prevent leakage. A bolt is used to position and clamp the center section between the flywheel housing and the drop box housing.

5 Claims, 2 Drawing Sheets

Fig_1_

CASELESS TRANSMISSION STRUCTURE

This is a file wrapper continuation of application Ser. No. 08/572,450, filed Dec. 14, 1995, now abandoned.

TECHNICAL FIELD

This invention relates to a transmission arrangement and more particularly to a structure wherein adjacent clutch housings form the outer case of the central portion of the transmission arrangement.

BACKGROUND ART

In transmission arrangements a cylindrical outer case is positioned between the flywheel housing section and the drop box housing section. The outer case had one end attached to the flywheel housing section and the other end attached to the drop box housing section and formed a sump for the intermediate section of the transmission arrangement. A plurality of clutch structures are positioned within the outer case. This structure could be costly and add weight to the transmission arrangement. It would be beneficial to have the clutch structures form the outer case of the transmission arrangement to reduce cost and reduce the weight of the transmission.

The present invention is directed to overcoming one or more of the problems as set forth above.

DISCLOSURE OF THE INVENTION

In accordance with one aspect of the present invention, a transmission arrangement having a flywheel housing section, a drop box housing section is shown. The transmission arrangement includes a central portion having a plurality of clutch housings which are positioned adjacent each other between the flywheel housing and the drop box housing. A mounting bolt extends between the flywheel housing and the drop box housing for clamping and positioning the plurality of clutch housings therebetween.

The present invention provides a plurality of clutch housing positioned adjacent one another to form the outer case of the transmission arrangement, thus reducing cost and weight of the transmission arrangement.

BEST MODE FOR CARRYING OUT THE INVENTION

Figure 1:
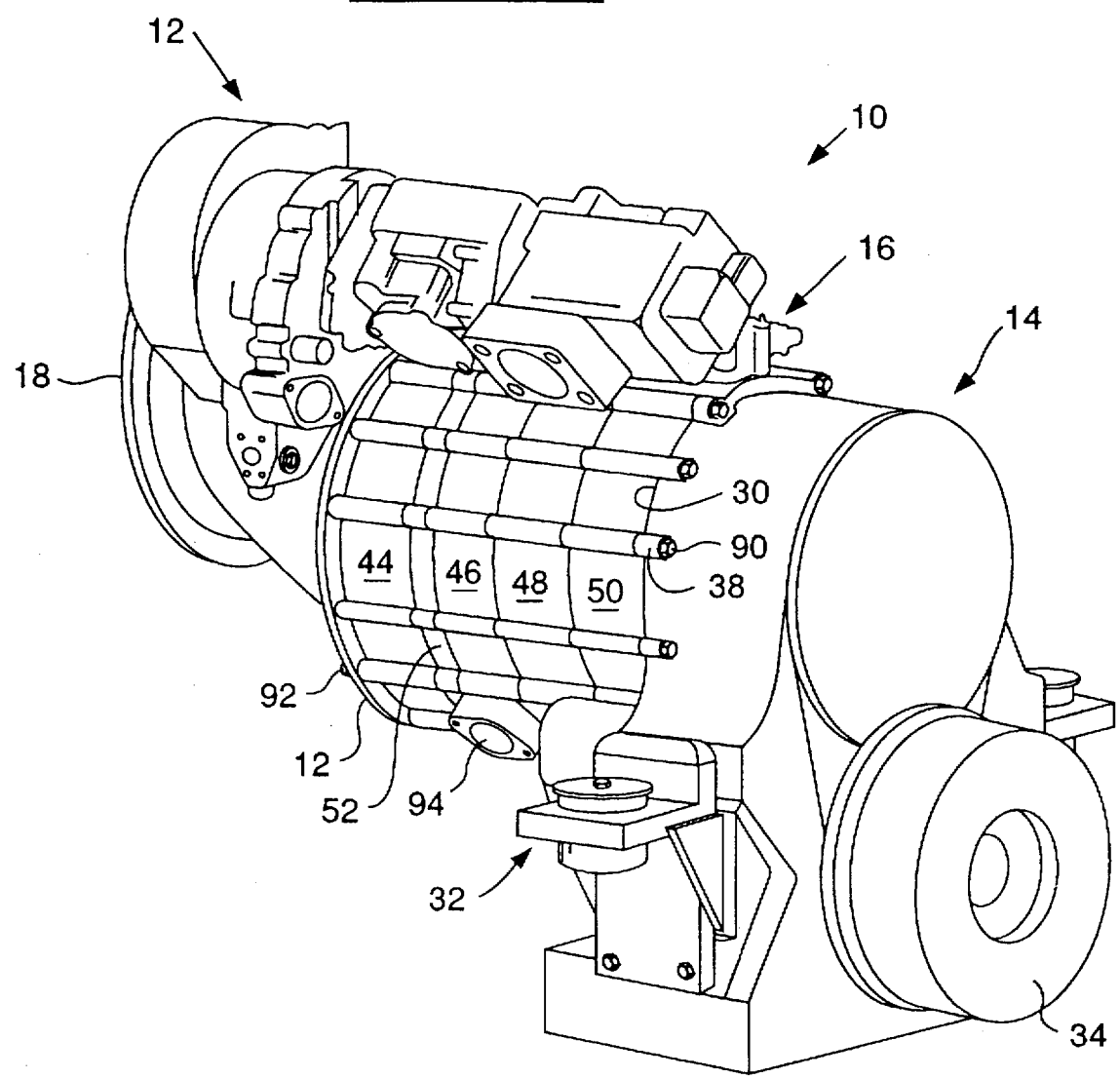
FIG. 1, is an isometric view of a transmission arrangement disclosing the present invention.
Figure 2:
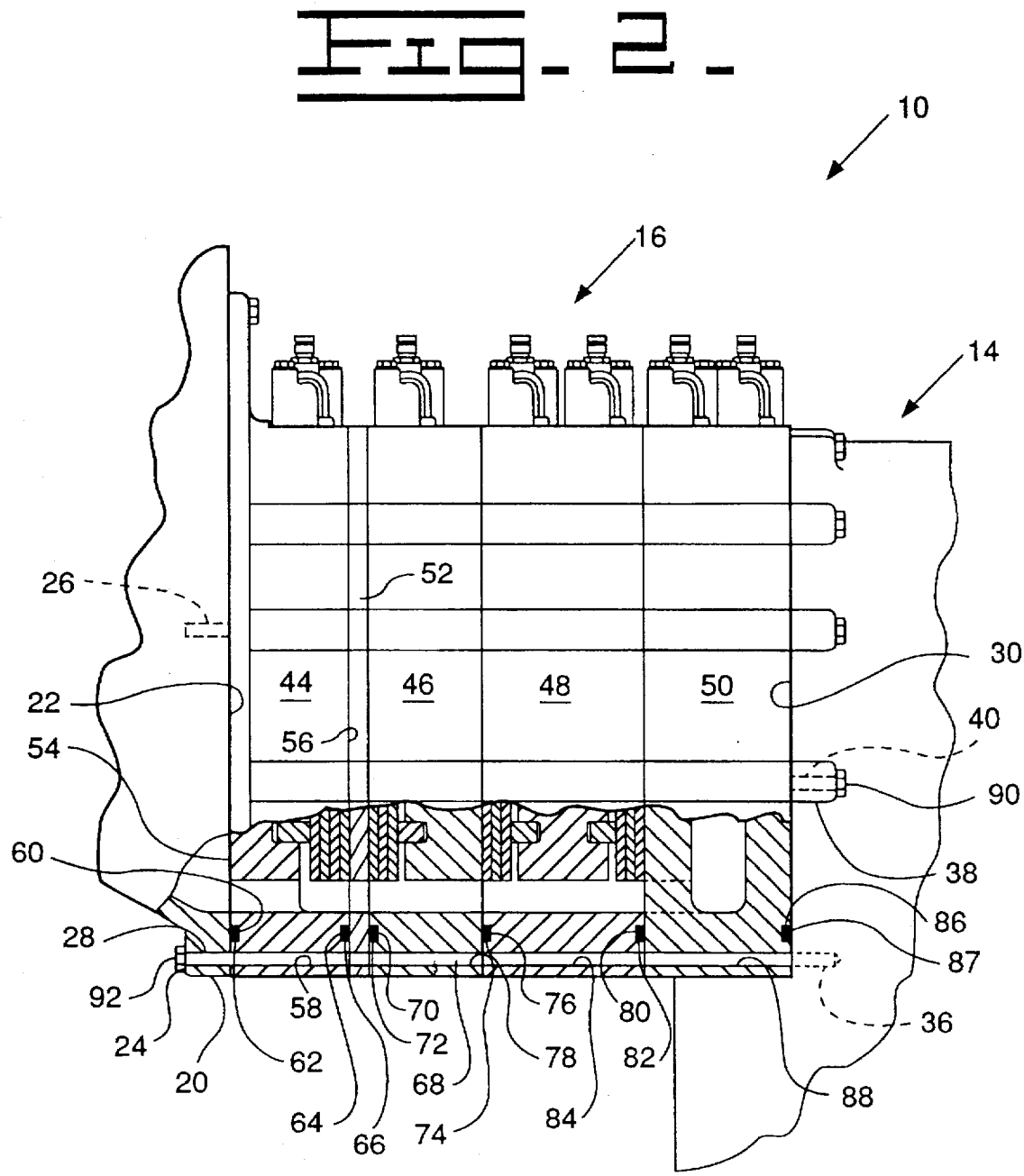
FIG. 2, is a partial sectional view of the transmission arrangement showing the present invention.

Referring to the drawings, a transmission arrangement 10 of the present invention is shown. The transmission arrangement 10 includes a flywheel housing section 12 at one end, a drop box housing section 14 at the other end and a center section 16 positioned between the flywheel housing 12 and the drop box housing 14.

The flywheel housing section 12 has a first mounting flange 18 suitable for attaching the transmission arrangement 10 to an engine, not shown, or other suitable power means. The flywheel housing section 12 has a second mounting flange 20 opposite the first mounting flange 18. The second mounting flange 20 has a mounting surface 22 and a reaction surface 24. At least one threaded mounting hole 26 extends from the mounting surface 22 into the mounting flange 20. At least one hole 28 extends from the mounting surface 22 through the second mounting flange 20 to the reaction surface 24.

The drop box housing section 14 has a mounting surface 30 which faces the mounting surface 22 of the second mounting flange 20. The drop box housing 14 has a structure 32 for attaching the transmission arrangement 10 to a frame member, not shown. The drop box housing section 14 has an output 34 for attachment to any suitable drive means, not shown. At least one threaded mounting hole 36 extends from the mounting surface 30 into the drop box housing section 14. At least one mounting ear 38 is provided on the drop box housing 14. The mounting ear 38 has a hole 40 which extends therethrough from the mounting surface 30.

The center section 16 is positioned between the mounting surface 22 of the flywheel housing 12 and the mounting surface 30 of the drop box housing 14. The center section 16 includes a plurality of clutch housings 44, 46, 48, 50 and a reaction plate 52 positioned adjacent each other. The clutch housing 44 has a first surface 54, a second surface 56 and a plurality of holes 58 extending therebetween. The first surface 54 has a groove 60 containing a seal 62 for sealing between the clutch housing 44 and the mounting surface 22 of the flywheel housing 12. The second surface 56 also has a groove 64 containing a seal 66 for sealing between the clutch housing 44 and the reaction plate 52. The reaction plate 52 has a plurality of holes 68 aligned with the holes 58 in the clutch housing 44. The clutch housing 46 has a groove 70 containing a seal 72 for sealing between the clutch housing 46 and the reaction plate 52. The clutch housing 46 has a plurality of holes 74 aligned with the holes 58 in the clutch housing 44. The clutch housing 48 has a groove 76 containing a seal 78 for sealing between the clutch housings 48 and 46. The clutch housing 48 also has a groove 80 containing a seal 82 for sealing between the clutch housings 48 and 50. The clutch housing 48 has a plurality of holes 84 aligned with the holes 58 in the clutch housing 44. The clutch housing 50 has a groove 86 containing a seal 87 for sealing between the clutch housing 50 and the mounting surface 30 of the drop box 14. The clutch housing 50 has a plurality of holes 88 aligned with the holes 58 in the clutch housing 44. At least one elongate bolt 90 is inserted through the hole 40 in the ear 38 and extends through the holes 88, 84, 74, 68, 58 and is threadably fastened in the hole 26 of the flywheel housing 12. At least one elongate bolt 92 is inserted through the hole 28 in the second flange 20 and extends through the holes 58, 68, 74, 84, 88 and is threadably fastened in the hole 36 of the drop box housing 14. The bolts 90, 92 clamp and position the central section 16 between the flywheel housing 12 and the drop box housing 14. The central section 16 provides a drain 94 in the clutch housing 46 to direct oil from the flywheel housing 12 and the central section 16 to the main sump in the drop box housing.

INDUSTRIAL APPLICABILITY

In the structure of the transmission arrangement 10 the center section 16 is constructed of individual clutch housings 44, 46, 48, 50, and the reaction plate 52 that are positioned adjacent each other. The seals 66, 72, 78, 82 are positioned between each adjacent housing. The seals 62, 87 are positioned between the center section 16 and the flywheel housing 12 and also the drop box housing 14. The central section is positioned and clamped between the flywheel housing 12 and the drop box housing 14 by the bolts 90 and 92. The clutch housing 44, 46, 48, 50 being sealed and connected together will eliminate the need for a outer housing around the central section 16.

In view of the foregoing, it is readily apparent that the structure of the present invention provides a transmission arrangement that has a plurality of clutch housings positioned adjacent each other between the flywheel housing and the drop box housing and which forms a portion of the outer case of the transmission arrangement. With the clutch housings forming a portion of the outer case the cost and weight of the transmission is reduced.

Other aspects, objects and advantages of this invention can be obtained from a study of the drawing, the disclosure and the appended claims.

I claim:

1. A transmission arrangement having a flywheel housing section and a drop box housing section, comprising:
    a central section having a plurality of clutch housings positioned adjacent each other between the flywheel housing and the drop box housing, each of the clutch housings having a surface which includes a groove;
    a seal positioned in the groove for sealing between adjacent clutch housing; and
    a mounting bolt extending through the plurality of clutch housings from the flywheel housing to the drop box housing for clamping and positioning the plurality of clutch housing therebetween.

2. The transmission arrangement of claim 1, wherein each clutch housing has a mounting hole extending therethrough.

3. The transmission arrangement of claim 2, wherein the mounting bolt extends through the mounting hole in each clutch housing.

4. The transmission arrangement of claim 1, wherein the plurality of clutch housings form an outer case of the transmission arrangement.

5. The transmission arrangement of claim 4, wherein the central section provides a drain to direct oil from the flywheel housing and the central section to the drop box housing.

* * * * *